2 Sheets—Sheet 1.
G. F. GODLEY.
Draw-Bar for Railway-Cars.
No. 223,130. Patented Dec. 30. 1879.
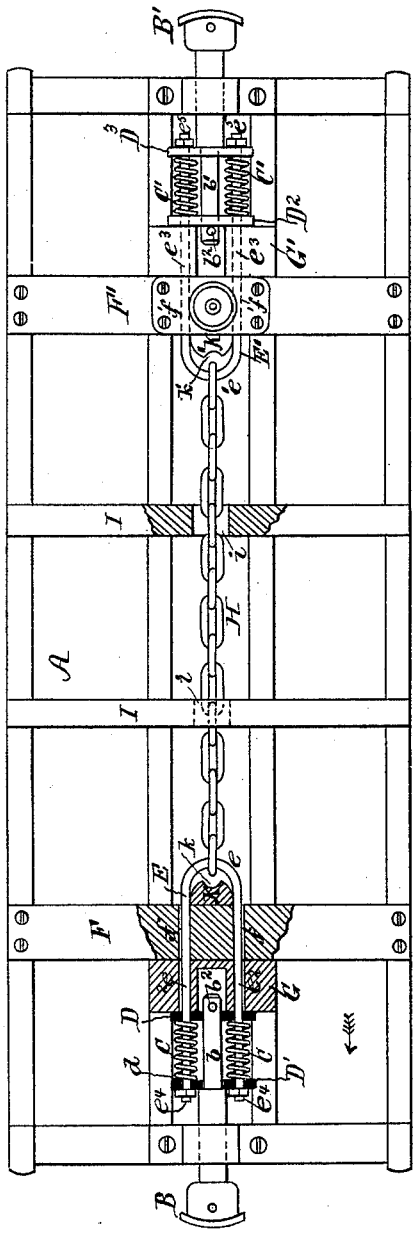
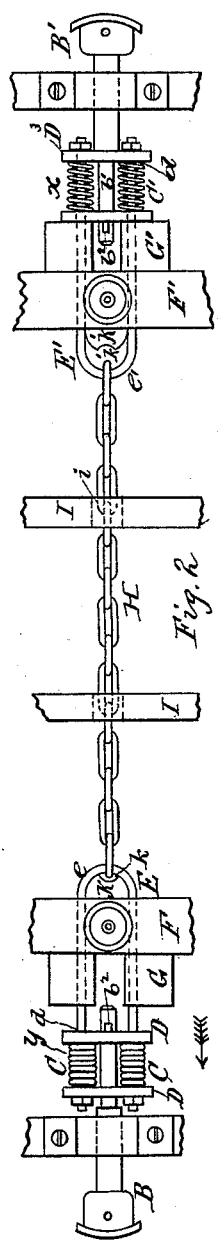
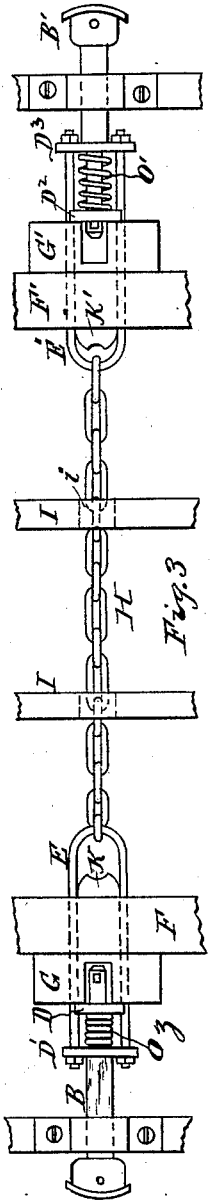
WITNESSES:
William Blayney
Charles A. Godley.
INVENTOR
George F. Godley.

G. F. GODLEY.
Draw-Bar for Railway-Cars.

No. 223,130. Patented Dec. 30, 1879.

WITNESSES:
William Blayney
Charles A. Godley

INVENTOR
George F. Godley

UNITED STATES PATENT OFFICE.

GEORGE F. GODLEY, OF PHILADELPHIA, PENNSYLVANIA.

IMPROVEMENT IN DRAW-BARS FOR RAILWAY-CARS.

Specification forming part of Letters Patent No. 223,130, dated December 30, 1879; application filed September 6, 1879.

*To all whom it may concern:*

Be it known that I, GEORGE F. GODLEY, of Philadelphia, in the county of Philadelphia and State of Pennsylvania, have invented certain new and useful Improvements in Draw-Bars for Railway-Cars; and I do hereby declare the following to be a full, clear, and exact description of the invention, such as will enable others skilled in the art to which it pertains to make and use it, reference being had to the accompanying drawings, which form part of this specification, in which—

Figures 1 and 2 are inverted plan views of my invention, the former being partly in section. Figs. 3, 4, 5, and 6 are like views of modified constructions of my improvements. Fig. 7 shows the application of my invention to a slotted draw-head, and Fig. 8 is a detail modification.

My invention has for its object to provide an improvement on Letters Patent of the United States granted to me on the 19th day of March, 1878, No. 201,517, for draw-bars for railway-cars.

In my former patent I used an intermediate central link with springs within the same, and affixed to the ends of the rods connecting said link to the draw-heads. This construction necessitated the passing of the said connecting-rods under or over the king-bolt, which practically was a disadvantage, and in many cases could not be used.

My present improvement has for its object to overcome said objection by constructing the draw-bar so as to dispense with said central link, and employing, instead, two links or loops, each connected to one of the draw-heads and passing through and to a short distance beyond the bolster, the two loops being connected by a rod, chain, or other suitable medium. Said links pass through and slide in openings in said bolsters on either side of the king-bolts, thereby avoiding the latter, which then offer no impediment to the direct path and free operation of the draw-bar.

My improvement has for its further object the provision of limiting pieces or timbers, whereby, when the draw-bar is subjected to draft or pulling strains, the movement of the rod or intermediate connections between the draw-heads will be stopped before the motion of the spring or springs placed upon the draw-bar at the end to which the draft is applied is exhausted, said limiting action having the effect of making the draw-bar doubly elastic under draft.

My invention accordingly consists of the combination, construction, and arrangement of parts, as hereinafter more fully set forth.

Referring to the accompanying drawings, A represents the frame-work of a car; B B', the draw-heads, having short stems $b$ $b'$, upon which are placed sliding plates D D' $D^2$ $D^3$, retained on said stems by the nuts or keys $b^2$, or both. E E' are links or loops, of iron or other suitable metal, formed of single pieces of metal, and are bent at $e$ $e'$ to form arms or branches $e^2$ $e^3$, which pass through openings $f$ $f'$ in the bolsters F F' and bumping-pieces G G', and also through apertures $d$ in the sliding plates D D', &c. The ends $e^4$ $e^5$ of said arms are provided with nuts or keys, or both, for retaining said parts together in their proper position.

C C' are springs placed upon the arms of the loops E E', between the plates D D' and $D^2$ $D^3$, so that when said plates are moved the springs will yield.

It will be noticed that the openings $f$ $f'$ are formed in the bolsters and bumping-pieces on each side of the king-bolt, a short distance from the same. The latter need not, therefore, be altered in form or changed in position to provide a direct path for the draw-rod, which has perfect freedom of motion to operate irrespective of the king-bolts.

H is a chain connecting the links E E' at their rear or bent ends, $e$ $e'$, as shown. Said chain passes through and is supported and slides in openings $i$ $i$ in the cross-timbers I I. Said parts or sections, when so combined, form a continuous rod or bar running from end to end of the car.

K K' are abutments or shields of iron or wood, and are secured to the bolsters F F'. They are preferably shaped to conform to the rounding ends $e$ $e'$ of the links or loops E E', and are formed with recesses $k$ $k'$, to receive and permit the projecting ends of the last links of the chain H to enter when said loops E E' are moved to cause their ends $e$ $e'$ to impinge against said abutments, as hereinafter more fully explained.

The operation is as follows: The draft or pulling force being applied to the draw-head B, it is moved in the direction indicated by the arrow, the key or nut $b^2$ on the stem $b$ of said draw-head impinging against the sliding plate D, placed thereon, which presses against the springs C, the latter coming in contact with the plate D'. Said springs and plates are then drawn forwardly, and with them the link E, chain H, link E', plates $D^2$ $D^3$, and springs C', until the end $e$ of said link E abuts against the block or shield K, when the forward motion of the links or loops E E', chain H and plates $D^2$ $D^3$, and springs C' C' is stopped, the springs C' being then only slightly compressed, as shown at $x$ in Fig. 2. The draft or pulling force, being continued, then falls wholly upon the forward springs, C, exhausting the same, as shown at $y$, Fig. 2, when the car has then obtained its initial movement, and the rear springs, C', being in an unexhausted condition to absorb the shock of starting the next succeeding car when the draft is transmitted thereto, thereby relieving the forward car-body of the strains resulting from the shock of starting the second car, and so on throughout the train.

In bumping, the cars come together, striking the ends of the draw-heads, the shock produced thereby being absorbed by the springs as they are compressed against the bumping-timbers G G', as shown at $z$ in Fig. 3.

The advantages of the foregoing construction are, that by its employment a continuous bar is produced, which, when used in combination with the limiting-pieces for stopping the movement of the draw-rod, or the intermediate connection between the draw-heads before the motion of the springs is exhausted at the end of the bar or car to which the draft is applied, has the effect of making said draw-bar elastic at both ends, whereby the strains and shock resulting from the starting of each succeeding car falls upon the springs and rod of the next forward car.

The bar being sectional, it can be removed from a car undergoing repairs in a space less than half the length of said car. Its avoidance of the king-bolt and the simplicity of its construction are such that it can be placed on any car.

Fig. 3 shows a modification in which the springs are placed upon the ends of the draw-head stems, in which case only two springs, O O', are employed, the result being the same as that already described. So, too, in cases where heavy-laden cars are to be started, springs may be placed on both the ends of the links and on the stems of the draw-head. In such cases six springs will be used—three at each end of the car or draw-bar.

In Fig. 4 the loops E E' are shown as made of separate rods $e^9$ $e^9$ and plates $e^6$ $e^6$, and are connected by a straight bar, H', instead of a chain.

Figs. 5 and 6 show the application of the limiting pieces or timbers to the form of draw-bars having center springs, as shown in my former patent. Said center springs, being the draw-springs, may be of a different capacity from that of the end or bumping springs. The stops or limiting-pieces in said figures being plates of metal, N N', against which the ends $m$ $m'$ of the rods M M' abut, said rods M M' may be straight, as shown in Fig. 6, or composed of swiveled links, as shown in Fig. 5.

Figure 4:
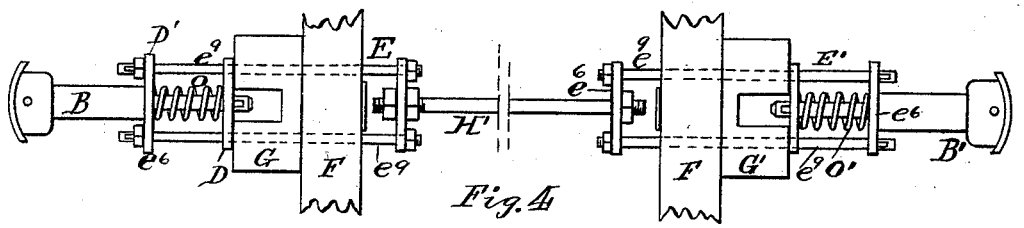
Figure 5:
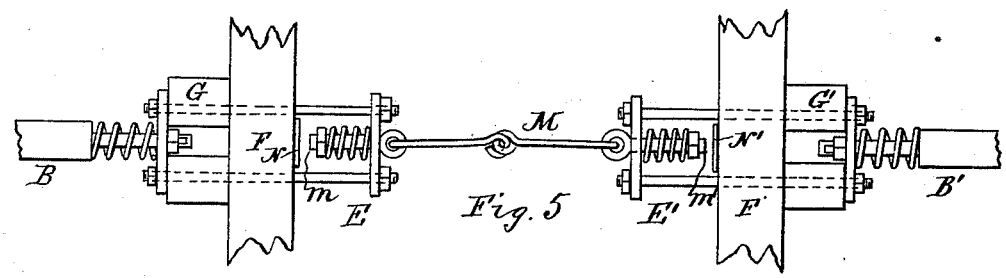
Figure 6:
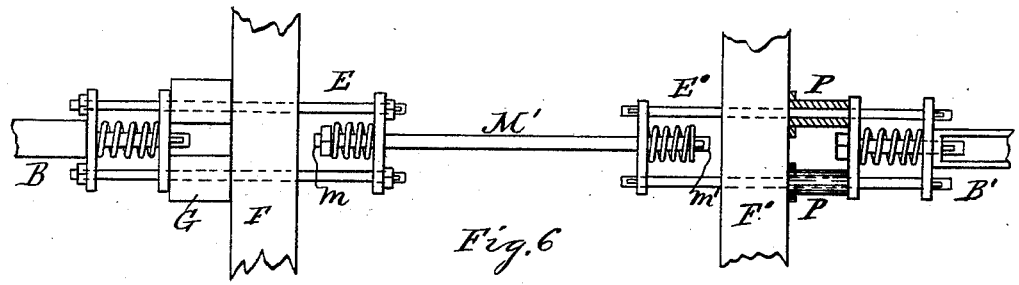
Figure 7:
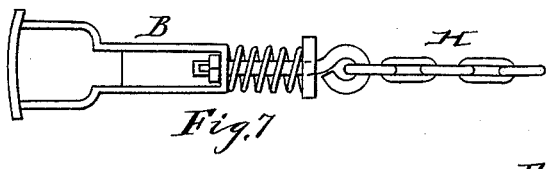
Fig. 7 shows the chain applied to a slotted draw-head, in which case the limiting-pieces may be placed either within the draw-head or attached to the bolsters, as described.
Figure 8:
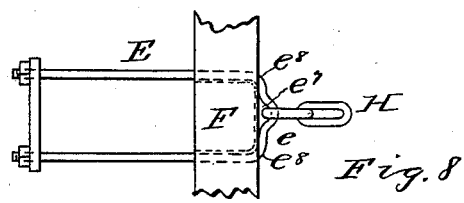
Fig. 8 shows the links or loops formed with straight ends $e$, having a nick or bent part, $e^7$, for the end link of the chain, and also rounded corners $e^8$ $e^8$. Where this form of link is used no extra abutting-pieces need be employed, the end of the links or loops E E' impinging directly against the bolster or in a recess formed therein.

Instead of using the slotted timber bumping-pieces G G', the flanged metal pipes P P may be used, as shown in Fig. 6, said pipes being placed upon the rods of the loop E' and abutting against the bolster F', as shown.

What I claim as my invention is—

1. A continuous draw-bar for railway-cars, composed of draw-heads, springs, and intermediate connections, in combination with interposed stops for limiting and stopping the movement of the intermediate connections between the draw-heads before the motion of said springs is exhausted when the draw-bar is subjected to draft or pulling strain, substantially as and for the purpose set forth.

2. In a continuous draw-bar for railway-cars, the combination of draw-heads B B', loops or links E E' and springs C C', and intermediate bars or chains connecting said links or loops, substantially as shown and described.

3. A draw-bar for railway-cars having intermediate connection between the draw-heads which pass around or on each side of the king-bolts, in combination with springs placed on the ends of said intermediate connection, substantially as set forth.

4. The combination of draw-heads B B', to each of which is secured a loop or link, E E', and interposed springs C C', substantially as shown and described.

5. In combination with draw-heads B B', loops or links E E' and springs C C', placed on the ends of said links or loops, substantially as shown and described.

6. In a draw-bar for railway-cars, the combination of draw-heads B B', loops or links E E', springs C C', and slotted bumping-pieces G G', substantially as shown and described.

7. The combination, with draw-heads B B' and intermediate connection between said draw-heads, of limiting pieces or timbers K K', substantially as and for the purpose set forth.

8. A draw-bar for railway-cars composed of draw-heads and attached sections, in combination with a chain or other flexible medium connecting said sections, substantially as shown and described.

In testimony that I claim the foregoing I have hereunto set my hand this 21st day of August, 1879.

GEORGE F. GODLEY.

Witnesses:
　FRANK H. MASSEY,
　J. R. MASSEY.